US008984446B1

(12) United States Patent
Meketa et al.

(10) Patent No.: US 8,984,446 B1
(45) Date of Patent: Mar. 17, 2015

(54) SHARING DISPLAY SPACES

(75) Inventors: Deneb Meketa, San Francisco, CA (US); Ethan Malasky, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 867 days.

(21) Appl. No.: 11/685,710

(22) Filed: Mar. 13, 2007

(51) Int. Cl.
*G06F 3/048* (2013.01)

(52) U.S. Cl.
USPC ............................ 715/853; 715/778; 715/797

(58) Field of Classification Search
CPC ....................................... G06F 3/048
USPC .......................... 715/853, 778, 797
See application file for complete search history.

(56) References Cited

U.S. PATENT DOCUMENTS

| | | | |
|---|---|---|---|
| 6,573,907 B1 | 6/2003 | Madrane | |
| 6,687,745 B1 | 2/2004 | Franco et al. | |
| 7,028,306 B2 | 4/2006 | Boloker et al. | |
| 2002/0052955 A1* | 5/2002 | Ebihara et al. | 709/225 |
| 2002/0194388 A1 | 12/2002 | Boloker et al. | |
| 2004/0239701 A1* | 12/2004 | Crichton | 345/853 |
| 2005/0108655 A1* | 5/2005 | Andrea et al. | 715/798 |
| 2008/0098296 A1 | 4/2008 | Brichford et al. | |

OTHER PUBLICATIONS

Colin Moock "*ActionScript for Flash MX: The Definitive Guide*," O'Reilly, Second Edition, 2002, pp. 339 and 818-821.
U.S. Appl. No. 11/685,695, Office Action dated Jun. 24, 2009, 11 pages (to be published by the USPTO).
Hunter, William E., Attorney for Assignee, in U.S. Appl. No. 11/685,695, filed Mar. 13, 2007, Response to Office Action submitted Sep. 21, 2009, 16 pages (to be published by the USPTO).
Meketa et al., "Securing Event Flow in a User Interface Hierarchy", U.S. Appl. No. 11/685,695, filed Mar. 13, 2007, 26 pages (to be published by the USPTO).

* cited by examiner

*Primary Examiner* — Andrea Leggett
(74) *Attorney, Agent, or Firm* — Shook, Hardy & Bacon L.L.P.

(57) ABSTRACT

In general, one aspect of the subject matter described in this specification can be embodied in a method for providing a hierarchical data structure to store nodes, wherein the nodes comprise graphical primitives to be rendered to a common display space of a computer system. The hierarchical data structure governs graphical compositing amongst the nodes. Two or more separate software applications are allowed to create nodes in the hierarchical data structure and share the common display space. The two or more separate software applications are restricted from accessing nodes in the hierarchical data structure based on node ownership information linking one or more nodes in the hierarchical data structure to a respective software application in the two or more separate software applications. The hierarchical data structure is used for rendering and displaying the common display space.

30 Claims, 4 Drawing Sheets

SHARING DISPLAY SPACES

BACKGROUND

The present disclosure relates to sharing display space among applications in an application execution environment and, in particular, where sharing the display space is based on a hierarchical data structure.

Generally, a display list is used to structure graphical objects and is used to render information to a display space (e.g., a display surface within a graphical user interface). The graphical objects in the display list represent commands that affect the information rendered to the display space. For example, the graphical objects in the display list can specify that a particular point, line or shape be drawn to a particular location in the display space using a particular color or style.

In some systems, a display space can be shared by multiple applications by partitioning the display space into separate windows or frames which can be assigned to a particular application. Each application is allowed to draw only into the window or frame to which it has been assigned.

In other systems, multiple applications are allowed to draw to a single display space. In doing so, an application can add graphical objects to a display list that is shared by the other applications sharing the display space. Such systems allow the applications to access and even manipulate some or all of the properties of graphical objects in the display list that were created and added by other applications.

SUMMARY

This specification describes technologies relating to sharing display space among applications in an application execution environment. In general, one aspect of the subject matter described in this specification can be embodied in a method that includes providing a hierarchical data structure to store nodes. The nodes include graphical primitives to be rendered to a common display space of a computer system. The hierarchical data structure governs graphical compositing amongst the nodes. Two or more separate software applications are allowed to create nodes in the hierarchical data structure and share the common display space. The two or more separate software applications are restricted from accessing nodes in the hierarchical data structure based on node ownership information linking one or more nodes in the hierarchical data structure to a respective software application in the two or more separate software applications. The hierarchical data structure is used for rendering and displaying the common display space. Other embodiments of this aspect include corresponding systems, apparatus, and computer program products.

These and other embodiments can optionally include one or more of the following features. Each node in the hierarchical data structure can be assigned to exactly one owner upon creation of the node. The restricting can be based on permission information specified by the exactly one owner of the node. A first software application of the two or more separate software applications can be assigned as owner of a root node of the hierarchical data structure, where the first software application is loaded before any other of the two or more separate software applications. The method can include determining whether a first software application of the two or more separate software applications consents to allow a second software application of the two or more separate software applications to access to the common display space, where the first software application can be owner of a root node of the hierarchical data structure. Based on the determination, the second software application can be allowed to manipulate the common display space. A request can be received from a first software application of the two or more separate software applications to load a second software application of the two or more separate software applications. The request can identify a first node in the hierarchical data structure. A second node in the hierarchical data structure can be created. The second node can be a child of the first node and can have ownership information linking the second node to the second software application.

The second software application can be restricted from accessing or creating any node not descendant from the second node. The first software application can be restricted from accessing any node descendant from the second node. A mask can be associated with a first software application in the two or more separate software applications. The mask can identify a portion of the common display space. Respective graphical primitives of one or more nodes in the hierarchical data structure can be prevented from being rendered to the portion of the common display space identified by the mask, where the one or more nodes have ownership information linking the one or more nodes to the first software application. A request can be received from a second application to load the first application, where loading the first application includes associating the mask with the first application.

Permission can be granted to a first software application of the two or more separate software applications to modify a node using a defined operation. The node can have ownership information linking the node to a second software application. The granting can be based on permission information associated with the second software application. The defined operation can be identified by the permission information. Each of the two or more separate software applications can be loaded using an isolation environment provided by the application execution environment.

The subject matter described in this specification can be embodied in a computer program product, encoded on a computer-readable medium, operable to cause data processing apparatus to perform the operations described above. In addition, the subject mailer described in this specification can be embodied in a system including a processor, and a computer-readable medium coupled with the processor and having encoded thereon an application execution environment configured to load applications while running on the processor, where the application execution environment is configured to perform the operations described above.

Particular embodiments of the subject matter described in this specification can be implemented to realize one or more of the following advantages. Mutually distrusting applications can share a common display space cooperatively without requiring that an application share its graphical primitives with any other application. The graphical primitives created by one application can be made inaccessible to other applications. An application can control where subordinate applications are allowed to draw in the display space without partitioning the display space into discrete areas using windows or frames. Access to the graphical primitives of an application can be based on permissions set by the application, which is assigned as owner of the graphical primitive. The ability of other applications to circumvent the hierarchy and manipulate the display space directly can be controlled by the application loaded into the application execution environment that initiates the hierarchy. The application that first initiates a display list for a display space can be given control over where in the display list another application can create graphical primitives.

BRIEF DESCRIPTION OF THE DRAWINGS

Like reference numbers and designations in the various drawings indicate like elements.

DETAILED DESCRIPTION

Figure 1:
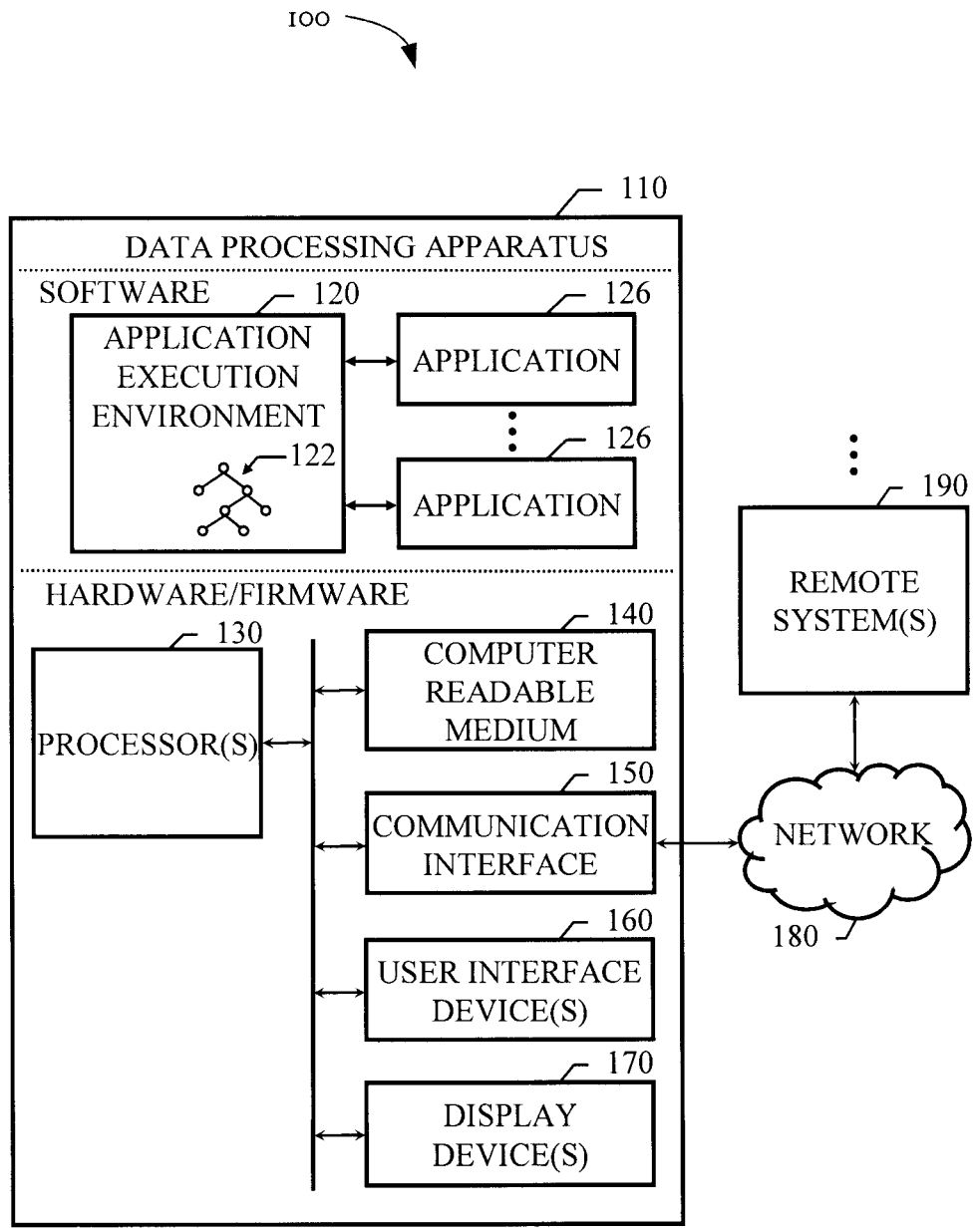
FIG. 1 is a diagram of an example system including a hierarchical data structure governing graphical composition to a common display space.

FIG. 1 shows an example system 100 including a hierarchical data structure 122 for governing graphical composition to a common display space. A data processing apparatus 110 can include hardware and firmware, which together provide a hardware platform, and software that runs on this hardware platform. The data processing apparatus 110 includes one or more processors 130 and at least one computer-readable medium 140. The data processing apparatus 110 can also include a communication interface 150, one or more user interface devices 160 and one or more display devices 170. A display device 170 generally corresponds to a graphical display device (e.g., a cathode-ray tube (CRT) monitor, liquid crystal display (LCD), or light emitting diode (LED) output). Generally one or more display devices 170, separately or in combination, can represent a display space to which display information (e.g., a raster graphics or graphical primitives) is rendered. A user interface device 160 can include a keyboard, mouse, stylus, other user input/output devices, or any combination thereof. Moreover, the data processing apparatus 110 can itself be considered a user interface device, such as when the software that effects the subject matter described herein is provided (in whole or in part) by one or more remote systems 190 (e.g., a server farm) over a data communication network 180 (e.g., the Internet). Thus, the apparatus 110 represents multiple types of computing systems, including, for example, a personal computer running a web browser or a mobile telephone running a Wireless Application Protocol (WAP) browser.

The software includes an application execution environment 120 that allows creation and presentation of user interface elements by multiple software applications 126. As used herein, "software application" and "application" refer to a computer program that functions as a distinct computer tool used for a defined purpose, and includes applications that can be plugged into other applications to form a composite application. The application execution environment 120 provides a software platform on which the applications 126 run, and the application execution environment 120 also provides a hierarchical structure 122 of nodes. Nodes in the hierarchical structure 122 include graphical primitives such as vector based objects (e.g., shapes, polygons, lines, points and surfaces), raster graphics (e.g., images, textures and patterns) or a combination of both. The hierarchical structure 122 is used to govern the graphical composition of graphical primitives for rendering to a display space. In some implementations, nodes in the hierarchical data structure can include all or part of a hierarchy of user interface elements such as windows, dialogs, widgets and labels. In some implementations, the hierarchical data structure corresponds to a display list that can be rendered by particular display devices in a two-dimensional drawing space or a three-dimensional display space.

The application execution environment 120 can be a virtualization environment that works in conjunction with native services (e.g., an operating system) of the data processing apparatus 110 to provide a consistent well-defined environment in which applications can be loaded and executed. The application execution environment 120 can include facilities such as memory management (e.g., garbage collection), standard libraries, media decoders, user interface frameworks and input-output interfaces. An application designed to run within an application execution environment can often be developed rapidly because developers can rely on the consistency of the application execution environment—even if the environment itself exists on widely varying hardware platforms. The application execution environment 110 can be a plug-in to a web browser or a stand alone software program in the data processing apparatus 110.

The application execution environment 120 can load an application 126 from an encoded representation of the application. For example, the encoded representation can have a pre-defined syntactic structure such as a programming language (e.g., source code) or can include well-defined virtual instructions (e.g., platform-independent bytecode, such as Macromedia Flash® bytecode). The encoded representation can correspond to a particular file, a part of a file, multiple files, a record in a database, a segment of memory or any other finite, contiguous or noncontiguous portion of a computer-readable medium. The location of an application's encoded representation can be specified by a universal resource locator (URL). To load applications, the application execution environment 120 can decode the encoded representation of the application 126 into instructions and can execute the instructions of the application 126. When the application execution environment 120 is designed as a virtualization environment in this manner, it can also be referred to as an interpreter, virtual machine. an interpreter or virtual machine. In addition, such an application execution environment often includes a runtime library that provides various utility services (e.g., string manipulation, networking, graphics, addressing peripherals, or other types of functionality) for use by the applications.

In general, an application in an application execution environment is able to request that one or more other applications be loaded into the same application execution environment. An application is associated with an application isolation environment that prevents the application from accessing, reading or otherwise interfering with other applications running within the application environment using other isolation environments. The application isolation environment facilitates concurrent execution of multiple applications that are mutually distrusting. That is, the applications, and the respective author of each application, need neither cooperate (e.g., share system resources) with nor expect cooperation from any other application in the application environment. In general, separate applications can be created and distributed by a variety of authors and publishers. For additional details regarding such application loading and application isolation environments, see U.S. patent application Ser. No. 11/677,557, filed Feb. 21, 2007, and entitled "APPLICATION MANAGEMENT".

The application execution environment 120 enables the separate software applications 126 to create nodes in the hierarchical structure 122 and share a common display space for the data processing apparatus 110 (e.g., multiple applications 126 can share a single window or area of in a graphical user interface). For example, the common display space can be a single drawing area, which is shared by the applications. Applications affect the display space by adding nodes, corresponding to graphical primitives, to the hierarchical data structure 122. Ownership information is established between nodes and applications to identify, for each node a particular application that owns the node. The ownership information can be used to restrict applications from accessing nodes that they do not own. Access to the hierarchical data structure 122 and its nodes, including creating new nodes, is governed by the application execution environment 120. The application execution environment can provide an interface such as an application programming interface for accessing and interacting with the hierarchical data structure.

Figure 2:
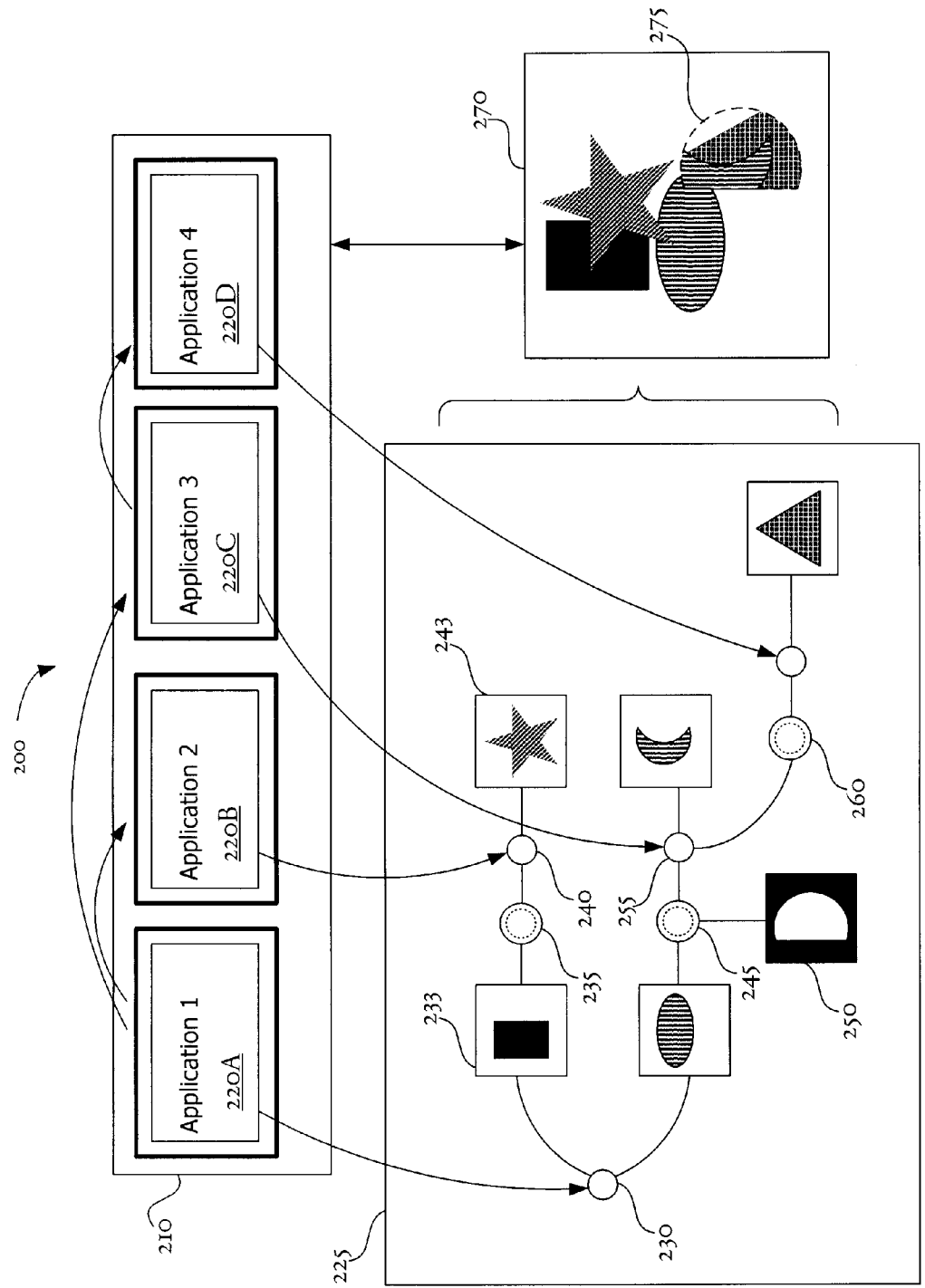
FIG. 2 is a diagram of example applications using a hierarchical data structure.

FIG. 2 is a diagram 200 of example applications 220A-D using a hierarchical data structure 225 to share a common display space 270. The applications are shown running in an application execution environment 210. In general, the earliest application loaded into the application execution environment 210 is associated with a root node 230, of the hierarchical data structure 225. The first application 220A, being loaded into the application execution environment before any other application, is made the owner of the root node 230. The application 220A adds nodes to the hierarchal data structure 225, such as the display node 233 specifying a solid rectangle. The application 220A is able to add any number of nodes in any manner of configuration (e.g., depth or breadth) within the hierarchy as long as the nodes descend directly (e.g., without intervening nodes) from a node owned by the application 220A. Typically, when a node is created by an application the node is owned by the application. In some implementations, a node owner is allowed to reassign ownership of a node to another application.

The application 220A can request that the application 220B be loaded into the application execution environment 210. In the request, the application 220A can create or identify a container node 235. The container node is a node to which the loaded application 220B is subordinate. The subsequently loaded application 220B is made owner of a contained node 240—a subordinate of the container node 235. The contained node can be created by the application execution environment automatically as a part of loading an application.

Application 220B, like application 220A, can add nodes to the hierarchical data structure 225 as long as the nodes descend from the contained node 240, owned by application 220B. For example, application 220B cannot create nodes descending directly from node 230, node 233 or node 235, but can create a note 243. The application 220B cannot read or manipulate any nodes in the hierarchical data structure 225 that the application does not own (without appropriate permission being granted). For example, the application 220B cannot read or alter the node 233. Similarly, the application 220A cannot read or manipulate the node 243 (without appropriate permission being granted).

In some implementations, the visual appearance of nodes at the bottom of the hierarchy (e.g., node 243), when rendered to the display space, need not be affected by parent nodes. Thus, child nodes can freely draw to the display space and can overwrite parent node graphical primitives, unless a parent node defines a subordinate area of the display space with which to restrict child nodes. For example, the visual representation of node 243 is larger than that of node 233 and the visual composition of both node 243 and node 233 in the display space 270 is not limited by the size of the respective separate visual representations of node 243 or node 233.

The application 220A can request that another application 220C be loaded into the application execution environment 210. The request can identify a container node 245. The application 220A can specify a mask 250 to be associated with the container node 245. Alternatively, the mask 250 can be associated with the application 220C. The mask 250 identifies an area of the display space within which subordinate nodes are allowed to draw. When a mask is specified with a load request, the mask is applied to the loaded application, and its nodes, as part of loading the application. In other words, at no time can the application that was loaded draw outside of the specified mask. When the application 220C adds nodes to its contained node 255, the visual representation of any added node is affected by the mask 250. For example, the outline 275 shown in the display space 270 represents the mask 250. The moon shape display node created by application 220C is effectively clipped by the mask 250 when rendered to the display space 270.

Generally, any application in the application execution environment can load other applications and identify a container node. For example, the application 220C can load the application 220D and identify a container node 260. The application 220C is, for example, also able to define a mask with respect to the container node 260.

In some implementations, an application can access a node of another application based on permissions associated with the other application. An application can be associated with permissions which are used in determining whether nodes of the application are accessible to other applications. For example, the application 220A may be associated with permissions that allow the application 220C to access the node 233. Permissions and node access are further described below in reference to FIG. 3.

Figure 3:
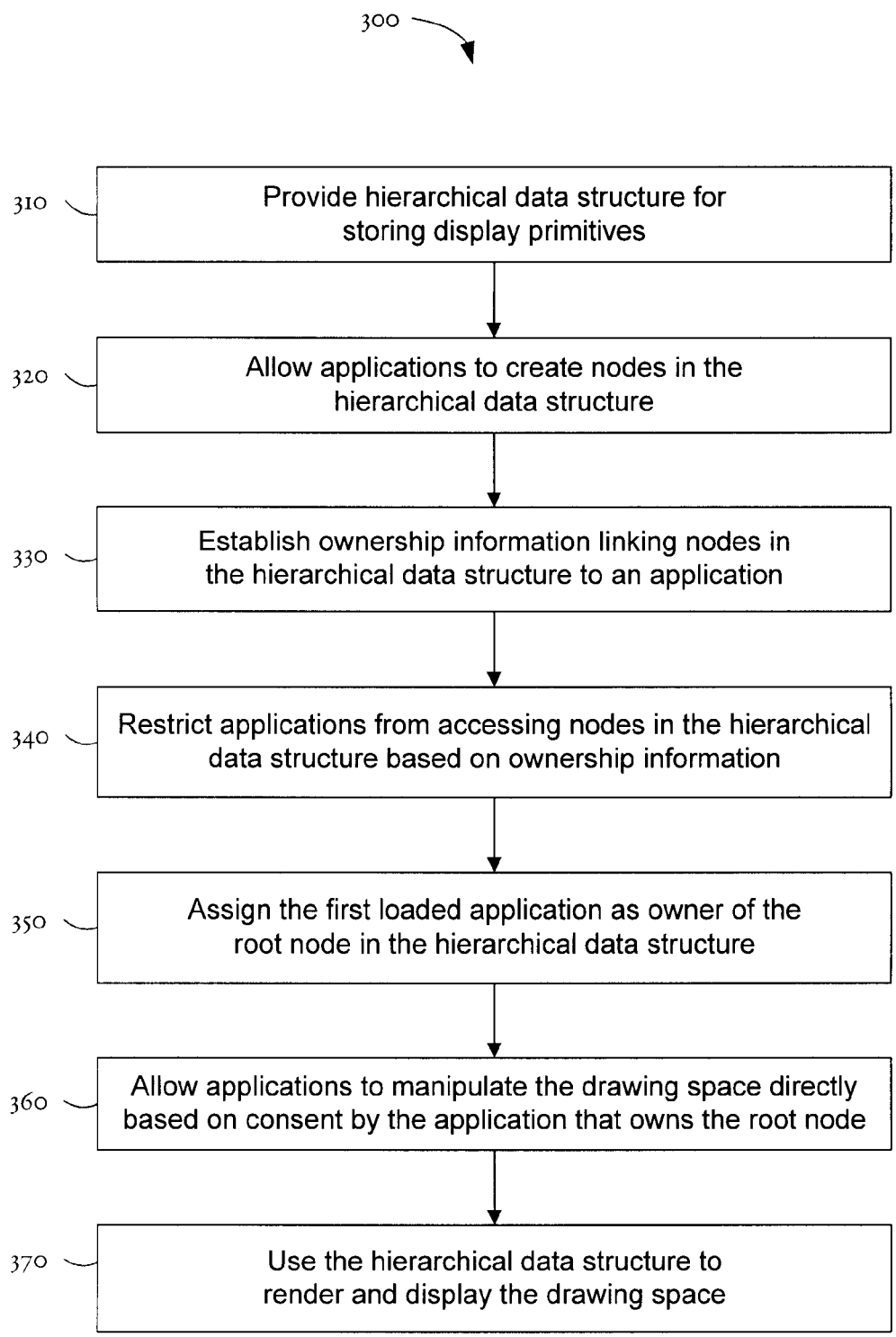
FIG. 3 is a flow diagram of an example process for restricting access to nodes in a hierarchical data structure.

FIG. 3 is a flow diagram of an example process 300 for restricting access to nodes in a hierarchical data structure. A hierarchical data structure for storing nodes of graphical primitives is provided 310 to applications in an application execution environment. Access to the hierarchical data structure by applications is controlled by the application execution environment in which the applications are running. The applications are allowed 320 to create or add nodes to the hierarchical data structure. Nodes represent graphical primitives that can be composed with other nodes and rendered to a common display space.

Ownership information is established 330, which links applications in the application execution environment with nodes in the hierarchical data structure. In some implementations, an application is the owner of any node that it creates. Alternatively, a node's owner can be assigned or reassigned in response to a request by an application. For example, a first application can reassign a node that it owns to a second application, making the second application the owner of the node. In some implementations, operations of the application execution environment can cause a node's owner to be assigned or reassigned. For example, when an application is loaded, a contained node can be created and the application can be made the owner of the node by the application execution environment automatically. In some implementations, each node is allowed to be owned by only a single application. Applications are restricted 340 from accessing a node in the hierarchical data structure based on the node's ownership information. For example, an application cannot access the nodes owned by another application. Alternatively, an application can be restricted from accessing all but the nodes that are owned by a class of applications. A class of applications can be all the applications associated with a particular author, publisher or owner. A class of applications can be all applications associated with the same isolation environment or all applications loaded from the same location on a network. For example, an application loaded from 'http://xyz.tld/app1.swf' can be allowed to access the nodes of an application loaded from 'http://xyz.tld/app2.swf' because both applications share a common network domain, namely 'xyz.tld'.

In some implementations, an application can specify permissions by which nodes owned by the application can be made accessible to other applications. Permissions can be specified as information associated with the application or can be specified by the application through an application program interface provided by the application execution environment. Permissions can identify particular applications or classes of applications and can specify one or more nodes. Permissions can allow an application to read or, alternatively, manipulate nodes owned by another application. In some implementations, a permission can identify particular operations that another application is allowed to carry out on a specified node. For example, a permission can identify an API operation (e.g., a function, a method or subroutine) which has a particular known effect on a node's graphical primitive (e.g., a scale effect or rotation effect).

The application loaded before any other application in the application execution environment (with respect to a given hierarchical data structure), is assigned 350 owner of the root node of the hierarchical data structure. The application owning the root node of the hierarchical data structure can control whether other applications are able to access the common display space directly.

In some implementations, an application can alter the display space directly and effectively circumvent (e.g., not affect) the hierarchical data structure. In such implementations, applications are only allowed to effect such alterations if the application owning the root node consents 360. The root owning application can, for example, provide a mechanism whereby another application can request access to the display space. Alternatively, consent can be given through permissions associated with the application that owns the root node. In general, altering the display space directly corresponds to any graphical operation that can be applied to the display space. Alterations can include, for example, drawing objects or pixels to a buffer corresponding to the display space. Alternatively, graphical operations can include image filters such as a blur, smooth, sharpen, pixelate, resize or color adjustments.

The application execution environment uses 370 the nodes of the hierarchical data structure to render the display space. In some implementations, each of the graphical primitives in the hierarchical data structure are composed (e.g., rasterized) in a pre-determined order (e.g., depth first) to the display space. The display space can be presented to a user.

Figure 4:
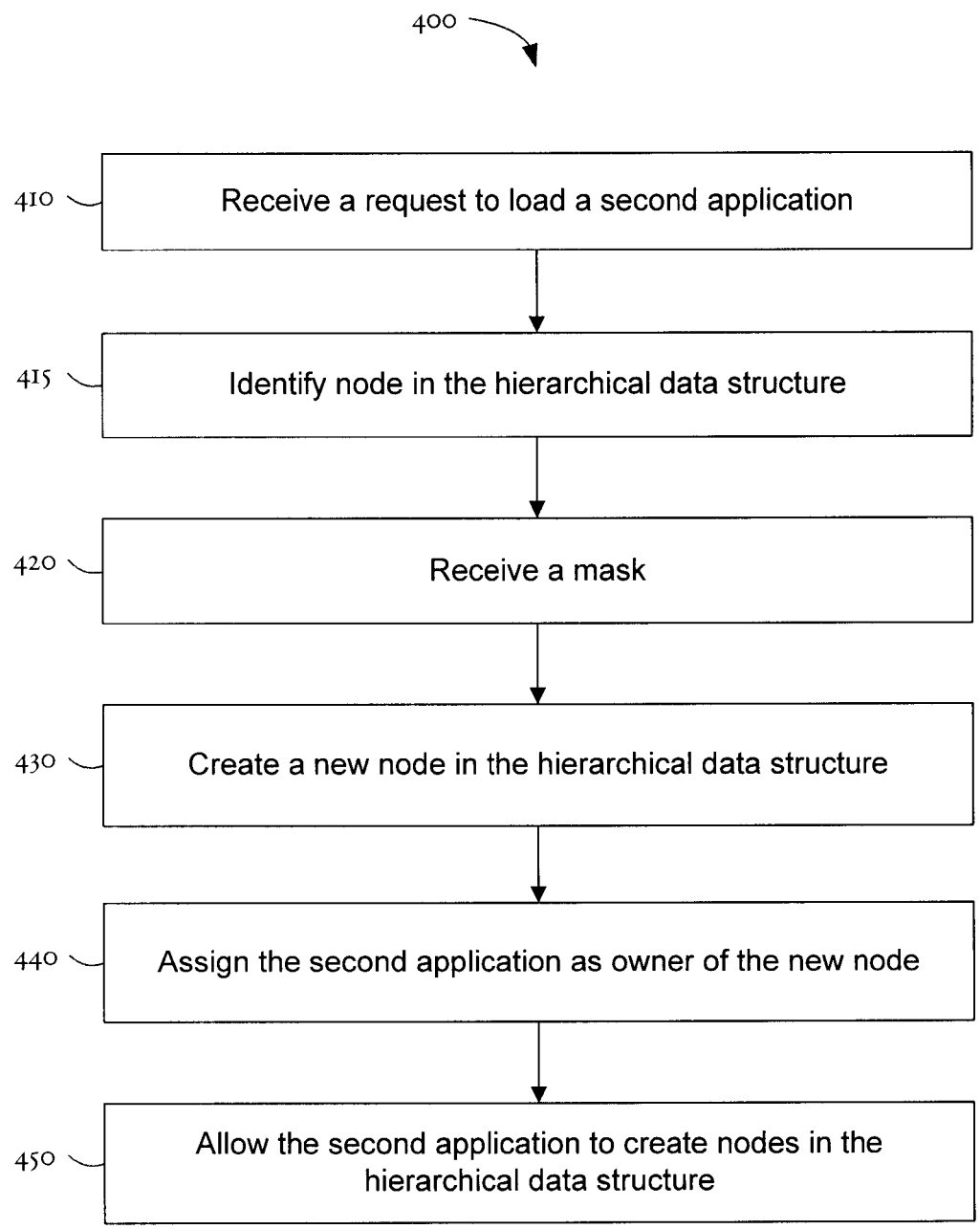
FIG. 4 is a flow diagram of an example process for sharing a hierarchical data structure with a second application.

FIG. 4 is a flow diagram of an example process 400 for sharing a hierarchical data structure with a second application. The following discussion presumes that a first application is running in the application execution environment. The first application can automatically be assigned owner of the hierarchical data structure and may have already added nodes to the structure.

A request is received 410 to load a second application into the application execution environment. Typically, the request is provided by the first application, however, in some implementations, a request can also be received from a component within the application execution environment, or even from outside the application execution environment. A node in the hierarchical data structure is identified 415. The node can be identified by the requesting application (e.g., in the request). Alternatively, the node can be identified automatically (e.g., based on a pre-determined default or by the application execution environment). Optionally, a mask, which specifies an area of a display space in which the second application can draw, is received 420. The mask can be provided with the request. Alternatively, the application execution environment can automatically assign a default mask to an application being loaded. In some implementations, the second application is allowed to specify a mask (e.g., associated with the application's contained node) that identifies an area of the display space in which the first application is not allowed to draw.

A new node is created 430 and added to the hierarchical data structure. The new node is created by the application execution environment on behalf of the second application being loaded. The new node is added to the hierarchical data structure so that it is descendent at least from the root node of the hierarchical data structure. In general, the first or only application running in the application execution environment owns the root node. All other nodes are added as a descendent of the root node regardless of whether a node is added by the application or the application execution environment. In some implementations, the new node is made to descend from the node identified 415 above. The second application is assigned 440 as owner of the new node. In general, the second application is allowed 450 to create and add nodes to nodes it already owns (e.g., descendent from the new node). In some implementations, the second application is allowed to add nodes descendent from other nodes it does not own if the owner consents (e.g., through permissions or a request mechanism).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows car also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
providing a hierarchical data structure to store nodes, wherein the nodes comprise graphical primitives to be rendered to a common display space of a computer system, and the hierarchical data structure governs graphical compositing amongst the nodes;
allowing two or more separate software applications to create nodes in the hierarchical data structure and share the common display space, without requiring a software application to share its graphical primitives with any other application and without partitioning the common display space into discrete areas using windows or frames;
restricting the two or more separate software applications from accessing nodes in the hierarchical data structure based on node ownership information linking one or more nodes in the hierarchical data structure to a respective software application in the two or more separate software applications; and
using the hierarchical data structure for rendering and displaying the common display space.

2. The method of claim 1, further comprising:
assigning each node in the hierarchical data structure to exactly one owner upon creation of the node, and wherein the restricting is based on permission information specified by the exactly one owner of the node.

3. The method of claim 1, further comprising:
assigning a first software application of the two or more separate software applications as owner of a root node of the hierarchical data structure, the first software application being loaded before any other of the two or more separate software applications.

4. The method of claim 1, further comprising:
determining whether a first software application of the two or more separate software applications consents to allow a second software application of the two or more separate software applications to access to the common display space, the first software application being owner of a root node of the hierarchical data structure; and
based on the determination, allowing the second software application to manipulate the common display space.

5. The method of claim 1, further comprising:
receiving a request from a first software application of the two or more separate software applications to load a second software application of the two or more separate software applications, the request identifying a first node in the hierarchical data structure; and
creating a second node in the hierarchical data structure, the second node being a child of the first node, the second node having ownership information linking the second node to the second software application.

6. The method of claim 5, further comprising:
restricting the second software application from accessing or creating any node not descendant from the second node; and
restricting the first software application from accessing any node descendant from the second node.

7. The method of claim 1, further comprising:
associating a mask with a first software application in the two or more separate software applications, the mask identifying a portion of the common display space; and
preventing respective graphical primitives of one or more nodes in the hierarchical data structure from being rendered to the portion of the common display space identified by the mask, the one or more nodes having ownership information linking the one or more nodes to the first software application.

8. The method of claim 7, further comprising:
receiving a request from a second application to load the first application, wherein loading of the first application includes associating the mask with the first application.

9. The method of claim 1, further comprising:
granting permission to a first software application of the two or more separate software applications to modify a node using a defined operation, the node having ownership information linking the node to a second software application, the granting being based on permission information associated with the second software application, the defined operation being identified by the permission information.

10. The method of claim 1, further comprising:
loading each of the two or more separate software applications using an isolation environment provided by the application execution environment.

11. A computer program product, encoded on a computer-readable medium, operable to cause data processing apparatus to perform operations comprising:
providing a hierarchical data structure to store nodes, wherein the nodes comprise graphical primitives to be rendered to a common display space of a computer system, and the hierarchical data structure governs graphical compositing amongst the nodes;
allowing two or more separate software applications to create nodes in the hierarchical data structure and share the common display space, without requiring a software application to share its graphical primitives with any other application and without partitioning the common display space into discrete areas using windows or frames;
restricting the two or more separate software applications from accessing nodes in the hierarchical data structure based on node ownership information linking one or more nodes in the hierarchical data structure to a respective software application in the two or more separate software applications; and
using the hierarchical data structure for rendering and displaying the common display space.

12. The computer program product of claim 11, the operations comprising:
assigning each node in the hierarchical data structure to exactly one owner upon creation of the node, and wherein the restricting is based on permission information specified by the exactly one owner of the node.

13. The computer program product of claim 11, the operations comprising:
assigning a first software application of the two or more separate software applications as owner of a root node of the hierarchical data structure, the first software application being loaded before any other of the two or more separate software applications.

14. The computer program product of claim 11, the operations comprising:
determining whether a first software application of the two or more separate software applications consents to allow a second software application of the two or more separate software applications to access to the common display space, the first software application being owner of a root node of the hierarchical data structure; and
based on the determination, allowing the second software application to manipulate the common display space.

15. The computer program product of claim 11, the operations comprising:
receiving a request from a first software application of the two or more separate software applications to load a second software application of the two or more separate software applications, the request identifying a first node in the hierarchical data structure; and
creating a second node in the hierarchical data structure, the second node being a child of the first node, the second node having ownership information linking the second node to the second software application.

16. The computer program product of claim 15, the operations comprising:
restricting the second software application from accessing or creating any node not descendant from the second node; and
restricting the first software application from accessing any node descendant from the second node.

17. The computer program product of claim 11, the operations comprising:
associating a mask with a first software application in the two or more separate software applications, the mask identifying a portion of the common display space; and
preventing respective graphical primitives of one or more nodes in the hierarchical data structure from being rendered to the portion of the common display space identified by the mask, the one or more nodes having ownership information linking the one or more nodes to the first software application.

18. The computer program product of claim 17, the operations comprising:
  receiving a request from a second application to load the first application, wherein loading of the first application includes associating the mask with the first application.

19. The computer program product of claim 11, the operations comprising:
  granting permission to a first software application of the two or more separate software applications to modify a node using a defined operation, the node having ownership information linking the node to a second software application, the granting being based on permission information associated with the second software application, the defined operation being identified by the permission information.

20. The computer program product of claim 11, the operations comprising:
  loading each of the two or more separate software applications using an isolation environment provided by the application execution environment.

21. A system comprising:
  a processor;
  a computer-readable medium coupled with the processor and having encoded thereon an application execution environment operable to load applications while running on the processor,
  the application execution environment operable to provide a hierarchical data structure to store nodes, wherein the nodes comprise graphical primitives to be rendered to a common display space of a computer system, and the hierarchical data structure governs graphical compositing amongst the nodes;
  the application execution environment operable to allow two or more separate software applications to create nodes in the hierarchical data structure and share the common display space, without requiring a software application to share its graphical primitives with any other application and without partitioning the common display space into discrete areas using windows or frames;
  the application execution environment operable to restrict the two or more separate software applications from accessing nodes in the hierarchical data structure based on node ownership information linking one or more nodes in the hierarchical data structure to a respective software application in the two or more separate software applications; and
  the application execution environment operable to use the hierarchical data structure for rendering and displaying the common display space.

22. The system of claim 21, the application execution environment further operable to:
  assign each node in the hierarchical data structure to exactly one owner upon creation of the node, and wherein the restricting is based on permission information specified by the exactly one owner of the node.

23. The system of claim 21, the application execution environment further operable to:
  assign a first software application of the two or more separate software applications as owner of a root node of the hierarchical data structure, the first software application being loaded before any other of the two or more separate software applications.

24. The system of claim 21, the application execution environment further operable to:
  determine whether a first software application of the two or more separate software applications consents to allow a second software application of the two or more separate software applications to access to the common display space, the first software application being owner of a root node of the hierarchical data structure; and
  based on the determination, allow the second software application to manipulate the common display space.

25. The system of claim 21, the application execution environment further operable to:
  receive a request from a first software application of the two or more separate software applications to load a second software application of the two or more separate software applications, the request identifying a first node in the hierarchical data structure; and
  create a second node in the hierarchical data structure, the second node being a child of the first node, the second node having ownership information linking the second node to the second software application.

26. The system of claim 25, the application execution environment further operable to:
  restrict the second software application from accessing or creating any node not descendant from the second node; and
  restrict the first software application from accessing any node descendant from the second node.

27. The system of claim 21, the application execution environment further operable to:
  associate a mask with a first software application in the two or more separate software applications, the mask identifying a portion of the common display space; and
  prevent respective graphical primitives of one or more nodes in the hierarchical data structure from being rendered to the portion of the common display space identified by the mask, the one or more nodes having ownership information linking the one or more nodes to the first software application.

28. The system of claim 27, the application execution environment further operable to:
  receive a request from a second application to load the first application, wherein loading of the first application includes associating the mask with the first application.

29. The system of claim 21, the application execution environment further operable to:
  grant permission to a first software application of the two or more separate software applications to modify a node using a defined operation, the node having ownership information linking the node to a second software application, the granting being based on permission information associated with the second software application, the defined operation being identified by the permission information.

30. The system of claim 21, the application execution environment further operable to:
  load each of the two for more separate software applications using an isolation environment provided by the application execution environment.

* * * * *